April 13, 1926.
C. W. JOHNSON
BEARING
Filed March 9, 1923
1,580,735
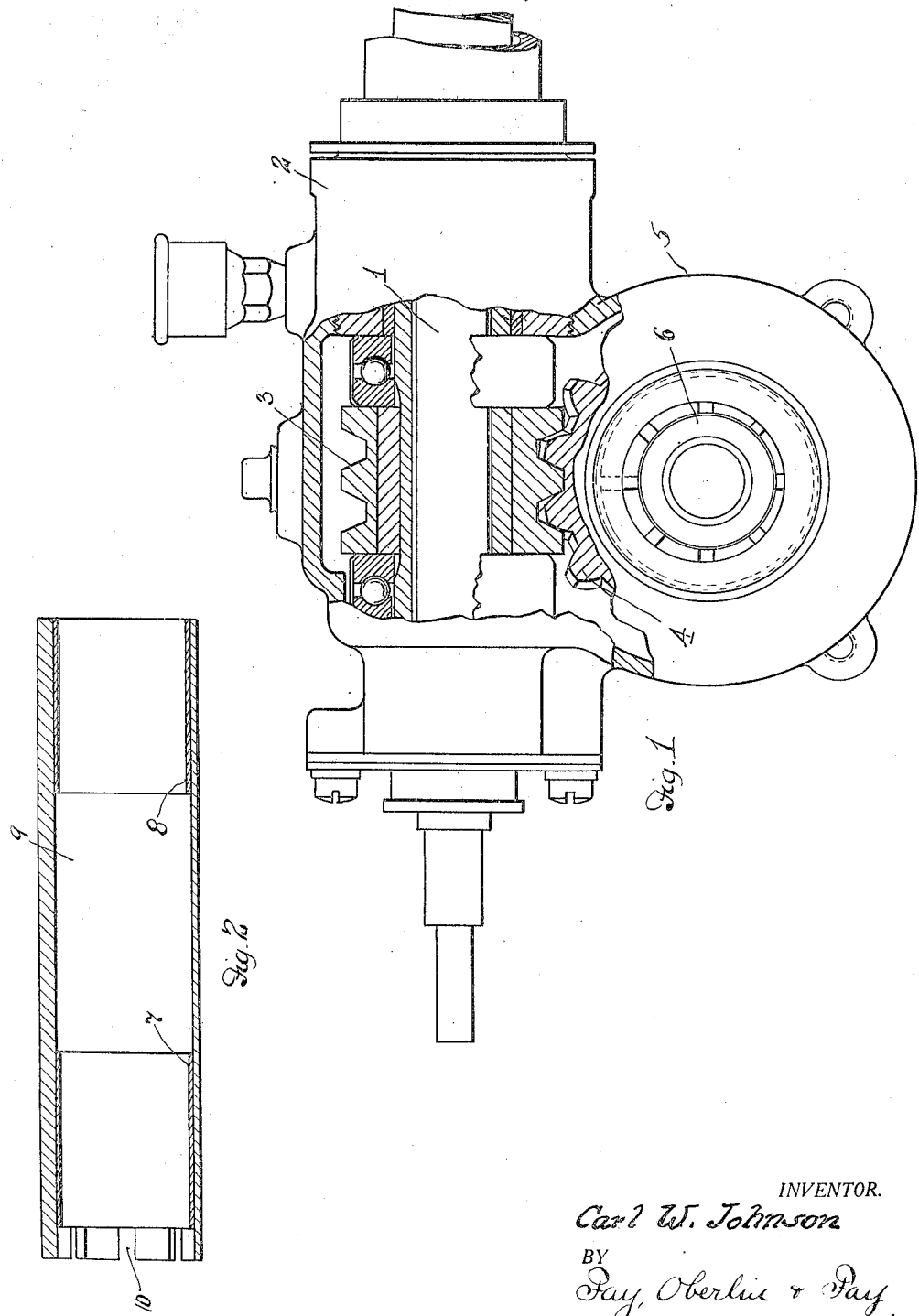
INVENTOR.
Carl W. Johnson
BY
Fay, Oberlin & Fay
ATTORNEYS Patented Apr. 13, 1926.

1,580,735

UNITED STATES PATENT OFFICE.

CARL W. JOHNSON, OF EAST CLEVELAND, OHIO, ASSIGNOR TO THE CLEVELAND GRAPHITE BRONZE COMPANY, OF CLEVELAND, OHIO, A CORPORATION OF OHIO.

BEARING.

Application filed March 9, 1923. Serial No. 623,835.

*To all whom it may concern:*

Be it known that I, CARL W. JOHNSON, a citizen of the United States, and a resident of East Cleveland, county of Cuyahoga, and State of Ohio, have invented a new and useful Improvement in Bearings, of which the following is a specification, the principle of the invention being herein explained and the best mode in which I have contemplated applying that principle, so as to distinguish it from other inventions.

The present invention, relating, as indicated, to bearings, is more particularly directed to an improved type of adjustable bearing, that is, one in which rotation of the bearing, or of an element carrying the bearing proper, effects a lateral adjustment of a member which is supported thereon. To the accomplishment of the foregoing and related ends, said invention, then, consists of the means hereinafter fully described and particularly pointed out in the claims.

The annexed drawing and the following description set forth in detail certain mechanism embodying the invention, such disclosed means constituting, however, but one of various mechanical forms in which the principle of the invention may be used.

In said annexed drawing:—

Fig. 1 is a side elevation partially in section illustrating one application of my improved invention; and Fig. 2 is a longitudinal central section through the bearing and enclosed shell.

In Fig. 1 I have shown the lower end of the steering column of a motor driven vehicle in which a steering shaft 1 is carried in a suitable housing 2, and is provided with a worm 3, which, upon rotation of the shaft 1, turns a worm gear 4 carried in a suitable extension 5 of the housing 2. It will be evident that continued operation of such a steering gear produces a wear on the engaging surface of the worm 3 and worm gear 4, and it is necessary to provide an adjustment between these two members to maintain tightness and proper operation. This adjustment is effected in the following manner.

The worm gear 4 is fixed to a shaft 6, which extends through and is journaled in two spaced cylindrical bearings 7 and 8, which are in turn fixed in a shell 9 mounted in suitable openings in either end of the housing 5. This shell 9 is provided with eccentric walls, that is, the wall of the shell is very much thicker on one side than upon the other, and tapers in thickness between these two points, as will be evident from Fig. 1. The shell is provided with a series of slots 10 in its outer end to permit of convenient turning to secure the adjustment. By turning the shell 10 the bearings 7 and 8, and also the shaft 6 which is carried therein, is brought toward or away from the axis of the shaft 1, and, correspondingly, the worm gear 4 is moved further into engagement with the worm 3 by a suitable rotation of the shell 10.

It will be evident that the present construction is very much less expensive than an individual bearing having the same area of bearing surface as is provided by the bearings 7 and 8 of the present device, and having at the same time the eccentric wall, which is necessary to secure the desired adjustment. Furthermore, wear upon the bearings 7 and 8 does not destroy the entire adjustable device, since the shell 9 can be removed in the present construction and new bearings substituted for the bearings 7 and 8 if the latter have been worn, while if the entire device is merely a single unitary eccentric bearing, wear on the inner bearing surface necessitates the replacement of the entire device.

Other modes of applying the principle of my invention may be employed instead of the one explained, change being made as regards the mechanism herein disclosed, provided the means stated by any of the following claims or the equivalent of such stated means be employed.

I therefore particularly point out and distinctly claim as my invention:—

1. An apparatus of the character described having in combination a steering shaft for a motor vehicle having a worm wheel at its lower end, a housing enclosing said worm wheel, an extension of said housing provided with aligned openings, a tubular shell received within said openings and having eccentrically disposed outer and inner walls and provided with a series of longitudinal slots formed at spaced intervals at one end thereof, replaceable sheet metal bearing elements mounted in said shell, one of said elements being positioned flush with the unslotted end of said shell, the other of said bearing elements being spaced from the opposite end of said shell, a distance sufficient to clear the slotted portion thereof, a shaft journaled in said bearings, a worm gear carried on said shaft and adapted to be adjusted in operative relation to said worm wheel through the adjustment of said eccentric shell by means of said slotted end.

2. A bearing for eccentric adjustment having in combination a tubular shell having eccentrically disposed outer and inner walls and provided with a series of longitudinal slots formed at spaced intervals at the one end thereof, replaceable sheet metal bearing elements mounted in said shell, one of said elements being positioned flush with the unslotted end of said shell, the other of said bearing elements being spaced from the opposite end of said shell a distance sufficient to clear the slotted portion thereof to permit engagement of said slotted end to rotate said shell to secure adjustment.

Signed by me, this 3 day of March 1923.

CARL W. JOHNSON.